(12) United States Patent
Mishra et al.

(10) Patent No.: US 10,353,689 B2
(45) Date of Patent: Jul. 16, 2019

(54) METHOD FOR TRANSFERRING A FILE VIA A MOBILE DEVICE AND MOBILE DEVICE FOR PERFORMING SAME

(71) Applicant: NCR Corporation, Duluth, GA (US)

(72) Inventors: Ravi Prakash Mishra, Uttar Pradesh (IN); Suman Kumar Bhowmick, Odisha (IN); Vivekanand Budharaju, Hyderabad (IN); Nayyar Husain Khan, Andhra Pradesh (IN)

(73) Assignee: NCR Corporation, Atlanta, GA (US)

( * ) Notice: Subject to any disclaimer, the term of this patent is extended or adjusted under 35 U.S.C. 154(b) by 282 days.

(21) Appl. No.: 14/838,428

(22) Filed: Aug. 28, 2015

(65) Prior Publication Data

US 2017/0063805 A1    Mar. 2, 2017

(51) Int. Cl.
| | |
|---|---|
| *G06F 8/65* | (2018.01) |
| *G06F 21/60* | (2013.01) |
| *G06F 8/654* | (2018.01) |
| *H04L 29/06* | (2006.01) |
| *H04L 29/08* | (2006.01) |
| *H04W 12/02* | (2009.01) |
| *H04W 12/06* | (2009.01) |

(52) U.S. Cl.
CPC ............... *G06F 8/65* (2013.01); *G06F 8/654* (2018.02); *G06F 21/606* (2013.01); *H04L 63/0428* (2013.01); *H04L 67/06* (2013.01); *H04W 12/02* (2013.01); *H04W 12/06* (2013.01); *G06F 2221/2107* (2013.01)

(58) Field of Classification Search
None
See application file for complete search history.

(56) References Cited

U.S. PATENT DOCUMENTS

| | | | | |
|---|---|---|---|---|
| 6,189,100 B1 * | 2/2001 | Barr | ...................... | G06F 21/575 380/255 |
| 8,589,236 B2 * | 11/2013 | Afana | ..................... | G06Q 20/20 705/16 |
| 8,745,651 B2 * | 6/2014 | Anguiano | .......... | H04N 21/2541 386/260 |
| 8,949,588 B1 * | 2/2015 | Ye | ......................... | G06F 21/568 713/2 |

(Continued)

FOREIGN PATENT DOCUMENTS

| | | | | |
|---|---|---|---|---|
| WO | WO 2009/137625 A2 * | 11/2009 | ............... | H04L 9/32 |
| WO | WO 2016/056986 A1 * | 4/2016 | ............... | H04L 9/08 |

*Primary Examiner* — Christopher A Revak
(74) *Attorney, Agent, or Firm* — Schwegman, Lundberg & Woessner

(57) ABSTRACT

A mobile device, such as a cellular phone, can transfer an encrypted file from a server to a terminal, such as an automated teller machine. The server can specify delivery to a specific terminal. The mobile device can download an encrypted file and identity metadata from at least one server. The mobile device can connect to a terminal, such as wirelessly or via a wired connection such as a universal serial bus (USB). The mobile device can match an identity of the terminal to an identity associated with the identity metadata. For a USB connection, the identity metadata can include a vendor identifier (VID), a product identifier (PID), and a unique terminal identifier. If the identities match, then the mobile device can upload the encrypted file to the terminal. If the identities do not match, then the mobile device can prevent the encrypted file from uploading to the terminal.

23 Claims, 3 Drawing Sheets

(56) References Cited

U.S. PATENT DOCUMENTS

| | | | | |
|---|---|---|---|---|
| 8,996,412 B2* | 3/2015 | Nagasaka | ............... | G06Q 10/00 705/14.49 |
| 9,071,580 B2* | 6/2015 | Pigeon | ................ | H04L 63/0435 |
| 9,652,460 B1* | 5/2017 | Barisic | ............... | G06F 17/30038 |
| 2006/0242404 A1* | 10/2006 | Su | ........................ | G06Q 20/027 713/150 |
| 2007/0177740 A1* | 8/2007 | Nakajima | ............ | G06F 21/6218 380/277 |
| 2007/0258595 A1* | 11/2007 | Choy | .................... | H04L 9/0827 380/278 |
| 2008/0034421 A1* | 2/2008 | Ahn | ........................ | G06F 21/10 726/17 |
| 2008/0279385 A1* | 11/2008 | Park | ................... | G06Q 20/1235 380/278 |
| 2009/0222659 A1* | 9/2009 | Miyabayashi | ...... | H04L 63/0823 713/156 |
| 2012/0040665 A1* | 2/2012 | Liu | ........................ | H04W 4/80 455/426.1 |
| 2012/0110345 A1* | 5/2012 | Pigeon | ................ | H04L 63/0435 713/189 |
| 2012/0240191 A1* | 9/2012 | Husney | ................ | H04W 12/04 726/3 |
| 2014/0274031 A1* | 9/2014 | Menendez | ........ | H04W 52/0209 455/426.1 |
| 2014/0324610 A1* | 10/2014 | Ans | .................... | G06Q 20/1085 705/21 |
| 2015/0181423 A1* | 6/2015 | Ji | .......................... | H04W 12/06 455/411 |
| 2015/0350170 A1* | 12/2015 | Roselle | .................... | G09C 5/00 713/171 |
| 2016/0219058 A1* | 7/2016 | Kim | ...................... | H04L 63/102 |
| 2016/0253274 A1* | 9/2016 | Huang | .................. | G06F 13/102 710/33 |
| 2017/0063805 A1* | 3/2017 | Mishra | .................... | G06F 8/654 |

* cited by examiner

METHOD FOR TRANSFERRING A FILE VIA A MOBILE DEVICE AND MOBILE DEVICE FOR PERFORMING SAME

BACKGROUND

Terminals, such as automated teller machines, are used extensively around the world. In some cases, a terminal can operate within a network that is inaccessible to an owner or operator of the terminal. For example, an automated teller machine can operate within a network that is controlled by a bank. The owner or operator (for example, a person who is contracted to maintain the ATM) may be unable to access the bank's network to provide software updates to the terminal, retrieve performance logs from the terminal, or transfer any other files to or from the terminal.

SUMMARY

A mobile device, such as a cellular phone, can transfer an encrypted file from a server to a terminal, such as an automated teller machine. The server can specify delivery to a specific terminal. The mobile device can download an encrypted file and identity metadata from at least one server. The mobile device can connect to a terminal, such as wirelessly or via a wired connection such as a universal serial bus (USB) wired connection. The mobile device can match an identity of the terminal to an identity associated with the identity metadata. For a USB connection, the identity metadata can include a vendor identifier (VID), a product identifier (PID), and a unique terminal identifier. If the identities match, then the mobile device can upload the encrypted file to the terminal. If the identities do not match, then the mobile device can prevent the encrypted file from uploading to the terminal.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

Figure 1:
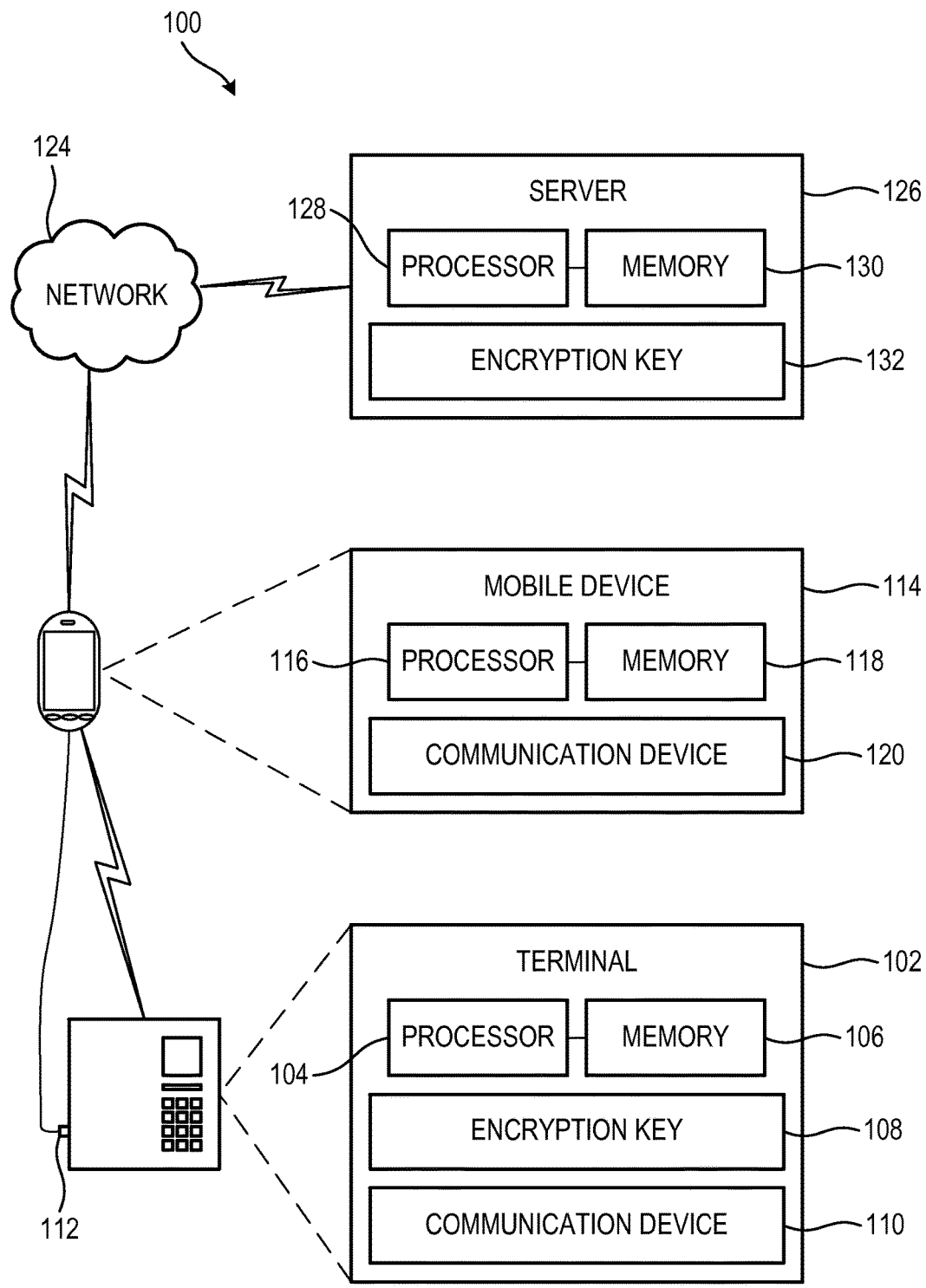
FIG. 1 shows an example of a system for transferring a file via a mobile device, in accordance with some embodiments.

A mobile device, such a cellular phone, can securely transfer data between a terminal and a server. Examples of a suitable terminal can include an automated teller machine, a kiosk, a self-service checkout station, and others. Examples of suitable data can include a driver for the terminal, a configuration file for the terminal, a software update for the terminal, a performance log from the terminal, or any suitable data. The data can be encrypted, so that during transit of the data, the mobile device cannot open, interpret, or edit the data.

A server can transfer data to a mobile device, with the intent of having the mobile device ultimately transfer the data to a specific terminal (e.g., not just any terminal, or one of any specific model of terminal, but one specific terminal unit).

Transferring the data from the server to the specific terminal can occur in two stages. In a first stage, the server can transfer the data to the mobile device. In a second stage, the mobile device can transfer the data to the specific terminal. Each of these stages is addressed in detail below.

In the first stage, the server can transfer the data to the mobile device. The mobile device can connect to the server. Once connected, the server can transfer two pieces of data to the mobile device.

The first piece of data can include an encrypted file, which can be the actual file that the server intends to transfer to the specific terminal. The encrypted file can include a driver, a configuration file, an executable file, an executable file that, when executed, requests one or more files from the terminal, or any other suitable file. The server may not pass the encryption key to the mobile device, so that the mobile device cannot open, interpret, or edit the encrypted file.

The second piece of data can include identity metadata, which includes an identity of the specific targeted terminal. For instance, for a system that includes multiple terminals, such as a network of automated teller machines, only one of the automated teller machines matches the identity included with the identity metadata. In some examples, after the server transfers the data to the mobile device, the mobile device can disconnect from the server. In some examples, the metadata can optionally be encrypted, and the mobile device can include a key to decrypt the metadata. For these examples, the metadata and encrypted file can be encrypted using different keys, where the mobile device has access to the key to decrypt the metadata, but does not have access to the key to decrypt the encrypted file. For these examples, the server can have access to both keys. For the remainder of this document, the term encryption key is intended to denote the key that can encrypt and/or decrypt the encrypted file, not the key that can encrypt and/or decrypt the metadata.

In the second stage, the mobile device can transfer the data to the specific terminal. The mobile device can connect to a terminal. An agent on the mobile device can perform a hardware-level handshake with an agent on the terminal to determine if the terminal is the specific device targeted by the server. For example, the mobile device can perform a hardware-level initialization to enable communication between the mobile device and the terminal. In some examples, the agent on the terminal can provide data including an identity of the terminal to the agent on the mobile device. For example, for configurations in which the mobile device connects to the terminal via a universal serial bus (USB) port on the terminal, the terminal can provide a vendor identifier (VID) and a product identifier (PID) of the terminal to the mobile device, along with a terminal identifier that can specify one particular terminal. The terminal identifier can include a serial number, or other unique identifier. Other suitable wired or wireless connections can also be used, including WIFI® and BLUETOOTH®, each having a suitable protocol for supplying identity information of the terminal to the mobile device.

If the identity of the terminal matches the identity included in the identity metadata from the server, the mobile device can determine that the terminal is the particular terminal targeted by the server, and can transfer the encrypted file to the terminal. For instance, if a VID, PID, and terminal identifier of a terminal match a corresponding VID, PID, and terminal identifier in the identity metadata, the mobile device can determine that the terminal is the particular terminal targeted by the server. For these examples, the terminal can already possess a suitable encryption key to open the encrypted file; the mobile device does not include the encryption key and does not transfer the encryption key to the terminal. In some examples, the terminal can open the encrypted file to perform instructions included in the encrypted file, such as installing particular software on the terminal, encrypt and copy logs of the terminal onto the mobile device, or other suitable tasks. In some examples, once the mobile device has confirmed the identity of the terminal, the terminal can optionally transfer a second encrypted file to the mobile device, with the intent of having the mobile device transfer the second encrypted file to the server. An example of a suitable second encrypted file can include encrypted logs from the terminal.

If the identity of the terminal does not match the identity included in the identity metadata from the server, then the mobile device may not pass the encrypted file to the terminal.

Note that data transfer protocol presented herein differs from that of a standard data transfer. In a standard data transfer, in which a device connects to a host, the device can provide whatever data is requested by the host. In the data transfer protocol presented herein, in which a mobile device connects to a terminal, the mobile device can determine what data to transfer to the terminal, rather than the terminal dictating what data is transferred. In this manner, the data transfer protocol presented herein can be more secure than a standard data transfer.

FIG. 1 shows an example of a system 100 for transferring a file via a mobile device, in accordance with some embodiments. The system 100 of FIG. 1 is but one example of such a system; other systems can also be used.

System 100 can include one or more terminals 102. Examples of a suitable terminal 102 can include an automated teller machine, a self-service checkout station, a cash kiosk, and others. For clarity, FIG. 1 shows only a single terminal 102; in practice, there can be a network of terminals, operating in one or more geographic regions in a city, state, country, or worldwide.

Terminal 102 can include at least one processor 104. For clarity, FIG. 1 shows only a single processor 104, but it will be readily understood that the terminal 102 can alternatively include multiple processors 104, and that data processing activities can be divided as needed among one or more of the processors 104.

Terminal 102 can include at least one memory device 106 storing instructions executable by the at least one processor 104. For clarity, FIG. 1 shows only a single memory device 106, but it will be readily understood that the terminal 102 can alternatively include multiple memory devices 106, and that storage functions can be divided as needed among one or more of the memory devices 106. The instructions can be executable by the at least one processor 104 to perform data processing activities.

Terminal 102 can include an encryption key 108, which can be used to decrypt files received by the terminal 102 and/or encrypt files to be sent from the terminal 102. Encryption key can be configured in software, in hardware, or in a combination of software and hardware in the terminal 102. In some examples, encryption key 108 can match a corresponding encryption key at a server, so that terminal 102 can decrypt encrypted files sent by the server and/or encrypt files that can be sent to the server and decrypted by the server.

Terminal 102 can include a communication device 110, which can connect to one or more external devices via one or more wireless and/or wired connections. In some examples, communication device 110 can include one or more transmitting and/or receiving antenna, and suitable radiofrequency circuitry to drive the one or more antenna and interpret signals received from the one or more antenna. In some examples, communication device 110 can communicate via wireless network protocols, including cellular networks, such as 3G or 4G, wireless personal area networks, wireless local area networks, wireless metropolitan area networks, wireless wide area networks, and others, as well as WI-FI®, BLUETOOTH®, and other non-networked (e.g., device-to-device) protocols. In some examples, communication device 110 can include one or more ports 112, into which an external device can be connected. Examples of suitable wired ports can include universal serial bus (USB), high-definitional multimedia interface, and others.

A field engineer or technician can transfer a file to and/or from the terminal 102 via a connection to a mobile device 114. In some examples, the file can include metadata that includes a specified server ID, from an array of servers. Such a connection can be temporary, lasting long enough to transfer any suitable files, and optionally, long enough for any particular files to execute on the terminal 102. After the file or files have been transferred, the mobile device 114 can disconnect from the terminal 102. The connection can be a wireless connection or a wired connection, such as a USB connection. Examples of a suitable mobile device 114 can include a cellular telephone, a smart phone, a laptop computer, and others.

Mobile device 114 can include at least one processor 116. For clarity, FIG. 1 shows only a single processor 116, but it will be readily understood that the mobile device 114 can alternatively include multiple processors 116, and that data processing activities can be divided as needed among one or more of the processors 116.

Mobile device 114 can include at least one memory device 118 storing instructions executable by the at least one processor 116. For clarity, FIG. 1 shows only a single memory device 118, but it will be readily understood that the mobile device 114 can alternatively include multiple memory devices 118, and that storage functions can be divided as needed among one or more of the memory devices 118. The instructions can be executable by the at least one processor 116 to perform data processing activities.

Mobile device 114 can include a communication device 120, which can connect to one or more external devices via one or more wireless and/or wired connections. Communication device 120 can be similar in function to communication device 110 of the terminal 102.

System 100 can include one or more servers 126. For clarity, FIG. 1 shows only a single server 126; in practice, there can be a network of connected servers 126, operating in one or more geographic regions in a city, state, country, or worldwide. In some examples, the one or more servers 126 can be owned and/or operated by the owner and/or operator of the terminal 102. In some examples, the one or more servers 126 can be used to generate files for distribution to particular terminals. Such files can include software updates, requests for performance logs, and others. Server 126 can be accessed through a network 124, such as a 3G or 4G network, or other suitable network.

Server 126 can include at least one processor 128. For clarity, FIG. 1 shows only a single processor 128, but it will be readily understood that the server 126 can alternatively include multiple processors 128, and that data processing activities can be divided as needed among one or more of the processors 128.

Server 126 can include at least one memory device 130 storing instructions executable by the at least one processor 128. For clarity, FIG. 1 shows only a single memory device 130, but it will be readily understood that the server 126 can alternatively include multiple memory devices 130, and that storage functions can be divided as needed among one or more of the memory devices 130. The instructions can be executable by the at least one processor 128 to perform data processing activities.

Server 126 can include an encryption key 132, which can be used to decrypt files received by the server 126 and/or encrypt files to be sent from the server 126. Encryption key 132 can be similar in function to encryption key 108 of the terminal. Mobile device 114 lacks an encryption key, so that encrypted files from the server 126 or the terminal 102 cannot be opened, interpreted, or edited by the mobile device 114.

Figure 2:
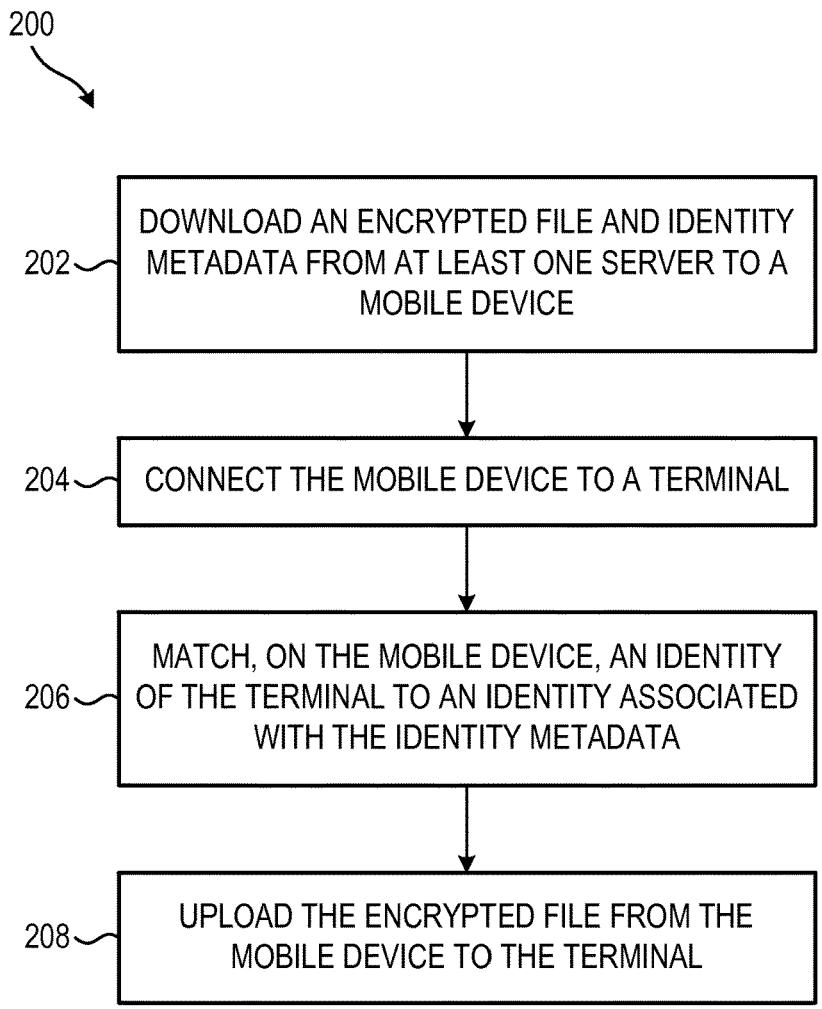
FIG. 2 shows an example of a method for transferring a file via a mobile device, in accordance with some embodiments.

FIG. 2 shows an example of a method 200 for transferring a file via a mobile device, in accordance with some embodiments. Method 200 can be executed by a mobile device, such as mobile device 114 (FIG. 1), or other suitable mobile devices. The method 200 is but one example for transferring a file via a mobile device; other suitable methods can also be used.

At operation 202, the mobile device can download an encrypted file and identity metadata from at least one server. In some examples, the mobile device can lack an encryption key associated with the encrypted file.

At operation 204, the mobile device can connect to a terminal. In some examples, the mobile device can connect to the terminal via a wired connection. In some of these examples, the wired connection is a universal serial bus (USB) wired connection. In other examples, the mobile device can connect to the terminal via a wireless connection.

At operation 206, the mobile device can match an identity of the terminal to an identity associated with the identity metadata. Operation 206 can optionally further include performing a hardware-level initialization to enable communication between the mobile device and the terminal. Operation 206 can optionally further include receiving at the mobile device, from the terminal, data including the identity of the terminal. In some examples, where the wired connection is a USB wired connection, the mobile device can receive, from the terminal, a vendor identifier (VID), a product identifier (PID), and a terminal identifier of the terminal. In some of these examples, the identity metadata can include a VID, a PID, and a terminal identifier. In some of these examples, the mobile device can match the VID received from the terminal to the VID of the identity metadata, can match the PID received from the terminal to the PID of the identity metadata, and match the terminal identifier received from the terminal to the terminal identifier of the identity metadata.

At operation 208, the mobile device can upload the encrypted file to the terminal. In some examples, where the mobile device connects to the terminal via a wired connection, the mobile device can upload the encrypted file to the terminal via the wired connection. In other examples, where the mobile device connects to the terminal via a wireless connection, the mobile device can upload the encrypted file to the terminal via the wireless connection. In some examples, the mobile device can securely delete the encrypted file after the mobile device completes the upload of the encrypted file to the terminal.

In some examples, operation 208 can occur after operation 206. Such an ordering can ensure that the terminal is indeed the correct terminal targeted by the at least one server. Once the identity is confirmed, the encrypted file can be uploaded. If the identity is not confirmed, then the encrypted file may not be uploaded.

In some examples, the encrypted file can include instructions to the terminal to encrypt and transfer a second encrypted file from the terminal to the mobile device. For these examples, method 200 can optionally further include downloading the second encrypted file from the terminal to the mobile device. For these examples, method 200 can optionally further include disconnecting the mobile device from the terminal. For these examples, method 200 can optionally further include uploading the second encrypted file from the mobile device to the at least one server.

Figure 3:
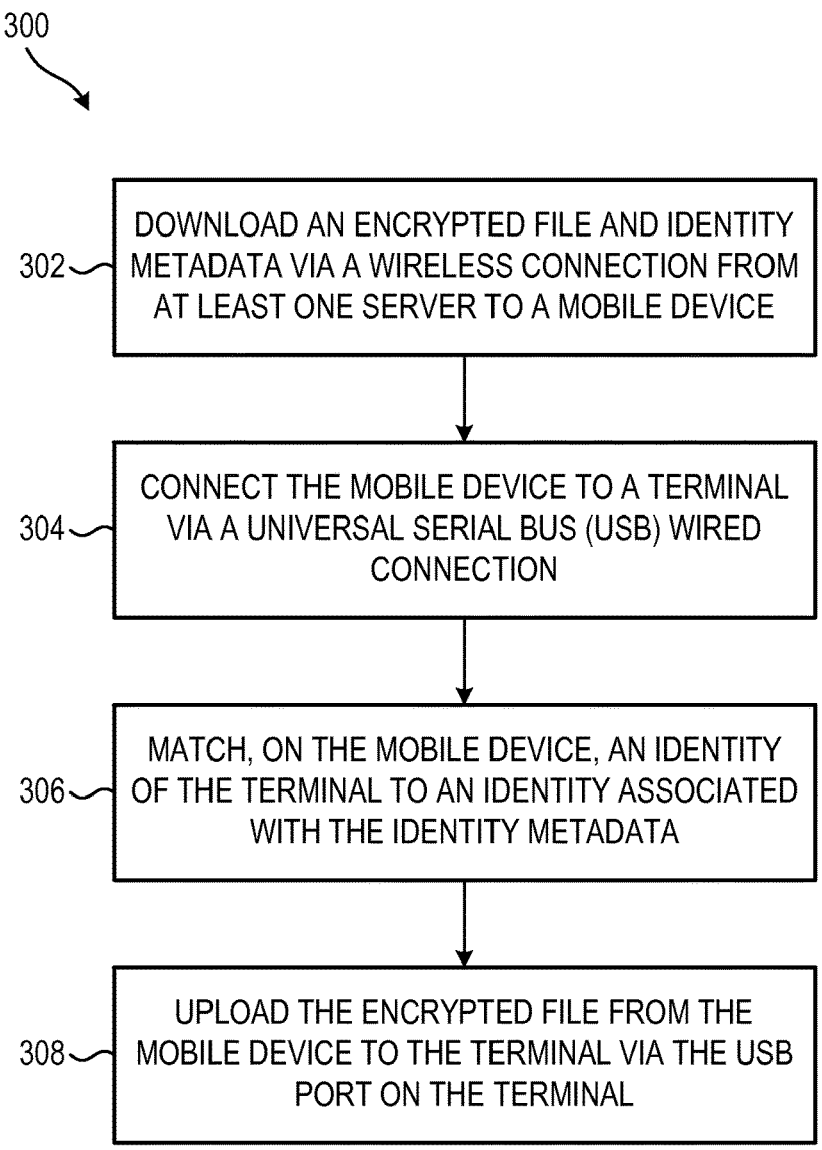
FIG. 3 shows another example of a method for transferring a file via a mobile device, in accordance with some embodiments.

FIG. 3 shows another example of a method 300 for transferring a file via a mobile device, in accordance with some embodiments. Method 300 can be executed by a mobile device, such as mobile device 114 (FIG. 1), or other suitable mobile devices. The method 300 is but another example for transferring a file via a mobile device; other suitable methods can also be used.

At operation 302, the mobile device can download an encrypted file and identity metadata via a wireless connection from at least one server. In some examples, the identity metadata can include a vendor identifier (VID), a product identifier (PID), and a terminal identifier. In some examples, the mobile device can lack an encryption key associated with the encrypted file At operation 304, the mobile device can connect to a terminal via a universal serial bus (USB) wired connection.

At operation 306, the mobile device can match an identity of the terminal to an identity associated with the identity metadata. In some examples, operation 306 can optionally further include performing a hardware-level initialization to enable communication between the mobile device and the terminal. In some examples, operation 306 can optionally further include receiving at the mobile device, from the terminal, data including a vendor identifier (VID), a product identifier (PID), and a terminal identifier of the terminal. In some examples, operation 306 can optionally further include matching the VID received from the terminal to the VID of the identity metadata, matching the PID received from the terminal to the PID of the identity metadata, and matching the terminal identifier received from the terminal to the terminal identifier of the identity metadata.

At operation 308, which can occur after operation 306, the mobile device can upload the encrypted file to the terminal via the USB wired connection.

In some examples, the encrypted file can include instructions to the terminal to encrypt and transfer a second encrypted file from the terminal to the mobile device via the USB wired connection. For these examples, method 300 can optionally further include downloading the second encrypted file from the terminal to the mobile device via the USB wired connection; disconnecting the mobile device from the terminal; and uploading the second encrypted file via the wireless connection from the mobile device to the at least one server.

Some embodiments may be implemented in one or a combination of hardware, firmware and software. Embodiments may also be implemented as instructions stored on a computer-readable storage device, which may be read and executed by at least one data processing device to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, checkout terminals may include one or more data processing devices and may be configured with instructions stored on a computer-readable storage device.

What is claimed is:

1. A method, comprising:
   downloading an encrypted file and identity metadata from at least one server to a mobile device by a processor of the mobile device;
   establishing, by the processor, a communication session with a terminal through a connection between the mobile device and the terminal;
   matching, by the processor, an identity of the terminal to an identity associated with the identity metadata during the communication session; and
   uploading, by the processor, the encrypted file from the mobile device to the terminal during the communication session.

2. The method of claim 1, wherein the matching, on the mobile device, of the identity of the terminal to the identity associated with the identity metadata occurs before the uploading of the encrypted file from the mobile device to the terminal.

3. The method of claim 1, wherein the matching, on the mobile device, the identity of the terminal to the identity associated with the identity metadata comprises:
   performing a hardware-level initialization to enable the communication session between the mobile device and the terminal; and
   receiving at the mobile device, from the terminal, data including the identity of the terminal.

4. The method of claim 1, wherein the encrypted file includes instructions to the terminal to encrypt and transfer a second encrypted file from the terminal to the mobile device.

5. The method of claim 4, further comprising:
   downloading, by the processor, the second encrypted file from the terminal to the mobile device;
   terminating, by the processor, the communication session with the terminal; and
   uploading, by the processor, the second encrypted file from the mobile device to the at least one server.

6. The method of claim 1, wherein the mobile device connects to the terminal via a wired connection and uploads the encrypted file to the terminal via the wired connection.

7. The method of claim 6, wherein the wired connection is a universal serial bus (USB) wired connection.

8. The method of claim 7, wherein the matching, on the mobile device, the identity of the terminal to the identity associated with the identity metadata comprises:
   performing a hardware-level initialization to enable the communication session between the mobile device and the terminal; and
   receiving at the mobile device, from the terminal, a vendor identifier (VID), a product identifier (PID) of the terminal, and a terminal identifier of the terminal.

9. The method of claim 8, wherein:
   the identity metadata includes a VID, a PID, and a terminal identifier; and
   the matching, on the mobile device, the identity of the terminal to the identity associated with the identity metadata comprises:
   matching the VID received from the terminal to the VID of the identity metadata;
   matching the PID received from the terminal to the PID of the identity metadata; and
   matching the terminal identifier received from the terminal to the terminal identifier of the identity metadata.

10. The method of claim 1, wherein the mobile device connects to the terminal via a wireless connection and uploads the encrypted file to the terminal via the wireless connection.

11. The method of claim 1, wherein the mobile device lacks an encryption key associated with the encrypted file.

12. A method, comprising:
    downloading, by a processor of a mobile device, an encrypted file and identity metadata via a wireless connection from at least one server;
    establishing, by the processor, a communication session with a terminal through a universal serial bus (USB) wired connection; and
    in the following order:
       matching, by the processor, an identity of the terminal to an identity associated with the identity metadata during the communication session; and
       uploading, by the processor, the encrypted file from the mobile device to the terminal via the USB wired connection during the communication session.

13. The method of claim 12, wherein the matching the identity of the terminal to the identity associated with the identity metadata comprises:
    performing a hardware-level initialization to enable the communication session between the mobile device and the terminal; and
    receiving at the mobile device, from the terminal, data including a vendor identifier (VID), a product identifier (PID), and a terminal identifier of the terminal.

14. The method of claim 13, wherein:
    the identity metadata includes a VID, a PID, and a terminal identifier; and
    the matching, on the mobile device, the identity of the terminal to the identity associated with the identity metadata comprises:
    matching the VID received from the terminal to the VID of the identity metadata;
    matching the PID received from the terminal to the PID of the identity metadata; and
    matching the terminal identifier received from the terminal to the terminal identifier of the identity metadata.

15. The method of claim 12,
    wherein the encrypted file includes instructions to the terminal to encrypt and transfer a second encrypted file from the terminal to the mobile device via the USB wired connection; and
    further comprising:
       downloading, by the processor, the second encrypted file from the terminal to the mobile device via the USB wired connection;
       terminating, by the processor, the communication session with the terminal; and
       uploading, by the processor, the second encrypted file via the wireless connection from the mobile device to the at least one server.

16. The method of claim 12, wherein the mobile device lacks an encryption key associated with the encrypted file.

17. A mobile device, comprising:
a communication device;
at least one processor; and
at least one memory device storing instructions executable by the at least one processor, the instructions being executable by the at least one processor to perform data processing activities, the data processing activities comprising:
  downloading, by the processor, an encrypted file and identity metadata from at least one server to the memory device;
  establishing, by the processor, a communication session with a terminal through a connection between the mobile device and the terminal using the communication device; and
  matching, by the processor, an identity of the terminal to an identity associated with the identity metadata during the communication session; and
  uploading, by the processor, the encrypted file from the mobile device to the terminal during the communication session.

18. The mobile device of claim 17, wherein the matching, on the mobile device, of the identity of the terminal to the identity associated with the identity metadata occurs before the uploading of the encrypted file from the mobile device to the terminal.

19. The mobile device of claim 17, wherein:
the connection comprises a universal serial bus (USB) wired connection; and
the matching, on the mobile device, the identity of the terminal to the identity associated with the identity metadata comprises:
performing a hardware-level initialization to enable the communication session between the mobile device and the terminal; and
receiving at the mobile device, from the terminal, a vendor identifier (VID), a product identifier (PID), and a terminal identifier of the terminal.

20. The mobile device of claim 19, wherein:
the identity metadata includes a VID, a PID, and a terminal identifier; and
the matching, on the mobile device, the identity of the terminal to the identity associated with the identity metadata comprises:
  matching the VID received from the terminal to the VID of the identity metadata;
  matching the PID received from the terminal to the PID of the identity metadata; and
  matching the terminal identifier received from the terminal to the terminal identifier of the identity metadata.

21. A method, comprising:
downloading an encrypted file and identity metadata from at least one server to a mobile device by a processor of the mobile device;
establishing, by the processor, a communication session with a terminal through a wire connection between the mobile device and terminal port of the terminal, the terminal port being identifiable by a unique identity;
requesting by the processor the unique identity from the terminal during the communication session;
matching, by the processor, the unique identity of the terminal port to an identity associated with the identity metadata from the at least one server during the communication session; and
uploading, by the processor, the encrypted file from the mobile device to the terminal during the communication session.

22. A method, comprising:
downloading an encrypted file and identity metadata from at least one server to a mobile device by a processor of the mobile device;
establishing, by the processor, a communication session with a terminal through a connection between the mobile device and the terminal;
authenticating the terminal during the communication session by the the processor, including
  requesting by the processor a unique identity from the terminal;
  matching, by the processor, the unique identity from the terminal to an identity associated with the identity metadata from the at least one server; and
uploading, by the processor, the encrypted file from the mobile device to the terminal during the communication session.

23. A mobile device, comprising:
a communication device having a unique identity;
at least one processor; and
at least one memory device storing instructions executable by the at least one processor, the instructions being executable by the at least one processor to perform data processing activities, the data processing activities comprising:
  downloading, by the processor, an encrypted file and identity metadata from at least one server to the memory device;
  establishing, by the processor, a communication session with a terminal through a connection between the mobile device and the terminal using the communication device;
  authenticating the terminal during the communication session by the processor, including
    requesting by the processor the unique identity of the communication device from the terminal;
    matching, by the processor, the unique identity from the terminal to an identity associated with the identity metadata from the at least one server; and
  uploading, by the processor, the encrypted file from the mobile device to the terminal during the communication session.

* * * * *